(12) United States Patent
Jung et al.

(10) Patent No.: US 7,349,674 B2
(45) Date of Patent: Mar. 25, 2008

(54) APPARATUS AND METHOD FOR SEPARATING TRANSMIT AND RECEIVE SIGNALS FOR TIME DIVISION DUPLEXING RADIO SYSTEM

(75) Inventors: Jae-Ho Jung, Daejeon (KR); Joon-Hyung Kim, Daejeon (KR); Kwang-Chun Lee, Daejeon (KR)

(73) Assignees: Electronics and Telecommunications Research Institute (KR); Samsung Electronics Co., Ltd. (KR); SK Telecom Co., Ltd. (KR); KT Corporation (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 599 days.

(21) Appl. No.: 11/026,834

(22) Filed: Dec. 30, 2004

(65) Prior Publication Data

US 2006/0040620 A1    Feb. 23, 2006

(30) Foreign Application Priority Data

Aug. 18, 2004    (KR)    .................... 10-2004-0065075

(51) Int. Cl.
    *H04B 1/46*    (2006.01)
(52) U.S. Cl. ........................ 455/82; 455/78; 455/83; 455/84; 370/280
(58) Field of Classification Search ............... 455/78, 455/82, 83, 84; 370/280
    See application file for complete search history.

(56) References Cited

U.S. PATENT DOCUMENTS

| | | | | | |
|---|---|---|---|---|---|
| 4,380,822 | A | * | 4/1983 | Broton | 455/80 |
| 5,701,595 | A | * | 12/1997 | Green, Jr. | 455/83 |
| 5,896,563 | A | * | 4/1999 | Kawanami et al. | 455/82 |
| 5,923,647 | A | * | 7/1999 | Dolman et al. | 370/280 |
| 6,313,713 | B1 | * | 11/2001 | Ho et al. | 333/1.1 |
| 6,374,087 | B1 | * | 4/2002 | Gressent et al. | 455/78 |
| 6,567,647 | B1 | * | 5/2003 | Epperson | 455/83 |
| 6,567,648 | B1 | * | 5/2003 | Ahn et al. | 455/83 |

FOREIGN PATENT DOCUMENTS

JP        09-116459    *    5/1997

* cited by examiner

*Primary Examiner*—Philip J. Sobutka
*Assistant Examiner*—Dominic E. Rego
(74) *Attorney, Agent, or Firm*—Blakely Sokoloff Taylor & Zafman (57) ABSTRACT

A receiver is protected by reducing a transmit leakage signal leaked when a transmit signal is radiated through the antenna by using three circulators (transmitter, antenna, and receiver). The transmitter and antenna circulators output the transmit leakage signal to be reduced to less than the transmit signal through a first leakage path. The transmitter and receiver circulators output the transmit leakage signal through a third leakage path and reduce the signal. The transmit leakage signals received through the first and third leakage paths are canceled, and that received through a second leakage path is output to a receiver. The transmit leakage signal has a 40 dB signal reduction compared to the transmit signal, and is transmitted to the receiver.

8 Claims, 6 Drawing Sheets

APPARATUS AND METHOD FOR SEPARATING TRANSMIT AND RECEIVE SIGNALS FOR TIME DIVISION DUPLEXING RADIO SYSTEM

CROSS REFERENCE TO RELATED APPLICATION

This application claims priority to and the benefit of Korea Patent Application No. 2004-65075 filed on Aug. 18, 2004 in the Korean Intellectual Property Office, the entire content of which is incorporated herein by reference.

BACKGROUND OF THE INVENTION (a) Field of the Invention

The present invention relates to a time division duplexing radio system. More specifically, the present invention relates to an apparatus and method for separating transmitted and received signals.

(b) Description of the Related Art

Time division duplexing TDD is a technique used to transmit and receive on a single frequency by dividing one frame into a frame for transmitting and a frame for receiving. While different frequencies are used for transmitting and receiving in a conventional radio communication, the same frequency is divided into different time slots for transmitting and for receiving in time division duplexing, and therefore bidirectional communication is performed.

Figure 1:
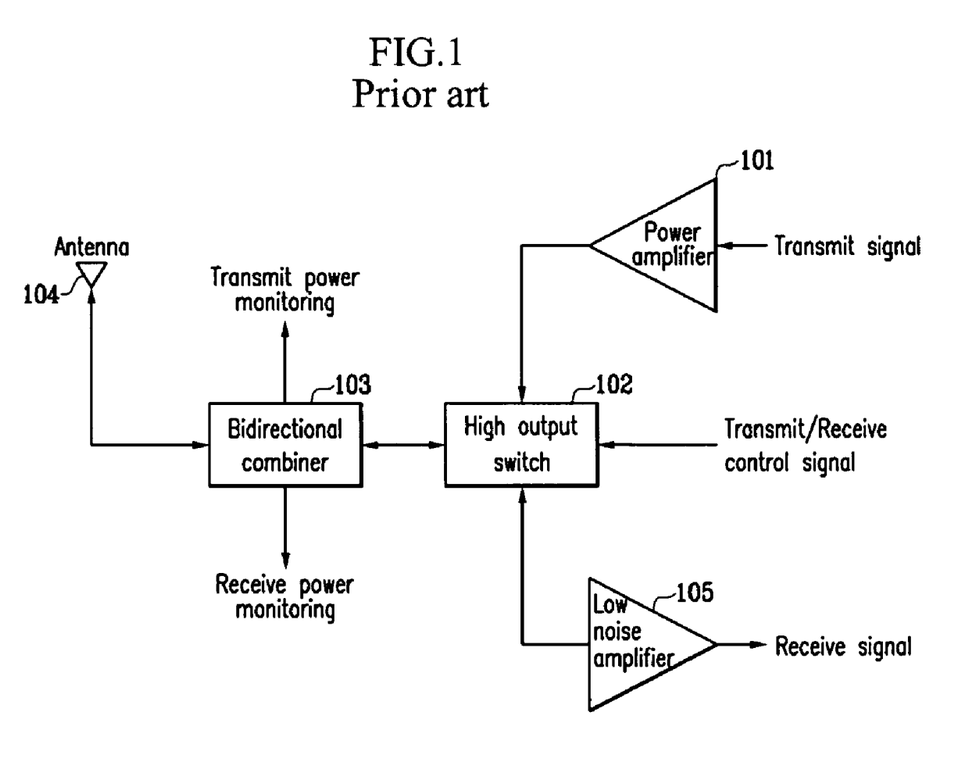
FIG. 1 and FIG. 2 show diagrams for representing an apparatus for separating transmit and receive signals in a conventional radio system.

The time division duplexing radio system has various configurations for separating transmitted and received signals, and a configuration using a high output switch is widely used among the configurations. FIG. 1 shows a radio system using the high output switch.

As shown in FIG. 1, the conventional radio system separates a transmit signal received from a power amplifier 101 and a receive signal received from a bidirectional combiner 103 by using the high output switch 102.

The high output switch is formed by using a semiconductor as a diode, and the semiconductor causes reduction of reliability of the radio system because the performance of the semiconductor is reduced when the semiconductor is used for a long time.

An additional control signal for operating the high output switch is also required, and it is a problem that a transmit/receive control signal is externally applied to the configuration of the radio system.

Figure 2:
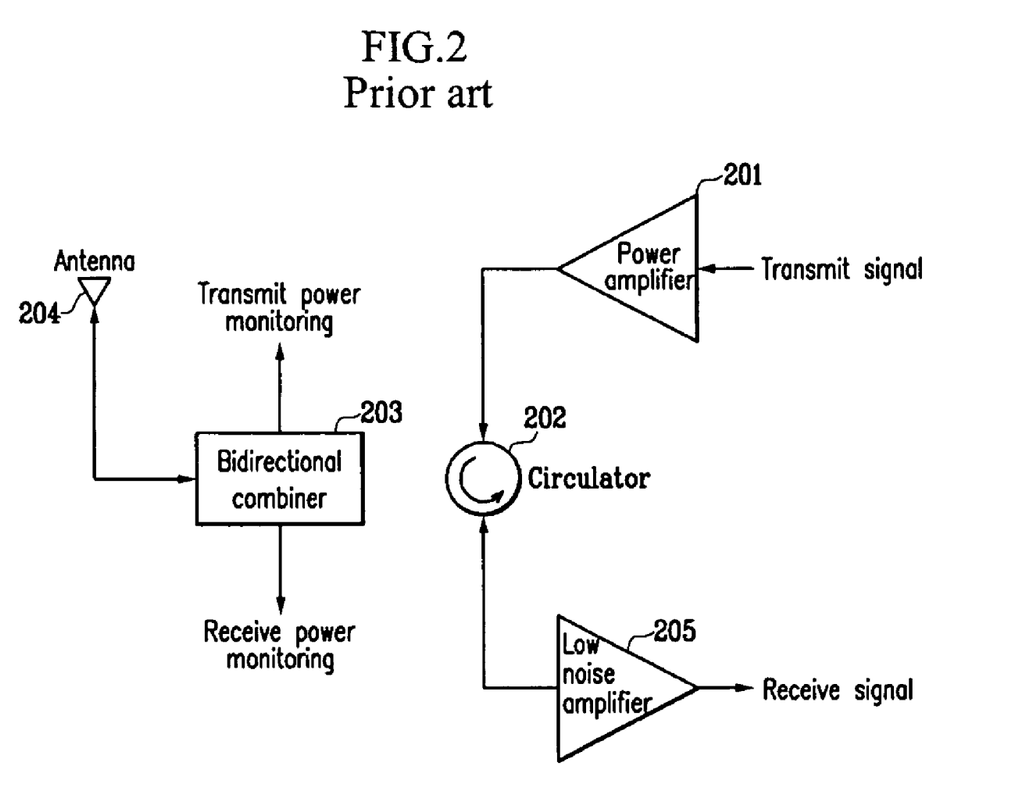

A radio system using a circulator is provided as another method for effectively separating the transmit/receive signals, which is shown in FIG. 2.

As shown in FIG. 2, the conventional radio system separates the transmit and receive signals by using a single circulator 202.

Isolation between transmitters and receivers in the configuration of the radio system depends on an isolation of the circulator 202, and therefore a signal sensitivity of the receiver in the configuration is reduced because the isolation of the conventional circulator is about 20 dB. Accordingly, an additional device for protecting the receiver is required.

The published U.S. patent application Ser. No. 6,567,648 B1 is disclosed related to a method for protecting the receiver. In the method, the receiver is protected by filtering the transmit signals between signals received from an antenna and leaked transmit signals and eliminating the signals.

However, a filter and an amplifier for eliminating the leaked signals are required in the method for protecting the receiver, and therefore an additional device is still required to protect the receiver.

SUMMARY OF THE INVENTION

It is an advantage of the present invention to provide an apparatus for separating transmit and receive signals in a radio system for transmitting and receiving a signal by using a single frequency and antenna according to the present invention.

The present invention discloses an apparatus for separating transmit and receive signals in a radio system. The apparatus includes: a power amplifier for amplifying a transmit signal and outputting the signal; a transmitter circulator for passing the amplified transmit signal through a transmission path in which a signal loss is minimized, and respectively outputting a transmit leakage signal through first, second, and third leakage paths for reducing the transmit leakage signal leaked when the amplified transmit signal is passed; an antenna circulator for passing the transmit signal received through the transmission path and radiating the signal through an antenna, and outputting the leaked transmit leakage signal to the first leakage path to be reduced; and a receiver circulator for inverting the transmit leakage signals received through the first and third leakage paths with respect to each other and canceling the signals, and reducing the transmit leakage signal received through the second leakage path and outputting the signal.

The apparatus further includes a bidirectional combiner for sampling part of the transmit signal received through the transmission path of the antenna circulator and the receive signal externally received through the antenna; and a reflection coefficient measuring unit for measuring a reflection coefficient of the antenna by measuring power of the sampled transmit and receive signals, and interrupting transmit signal output of the power amplifier when the measured reflection coefficient exceeds a reference value.

The present invention also discloses a method for separating transmit and receive signals in a radio system. In the method, a) a transmit signal is amplified and the amplified signal is output, b) a transmit leakage signal is respectively output through first, second, and third leakage paths for reducing the transmit leakage signal leaked when the amplified transmit signal passes through a transmission path, c) the amplitude of the transmit leakage signal leaked when the transmit signal is radiated through the antenna is reduced by outputting the signal through the first leakage path, d) the transmit leakage signals received through the first and third leakage paths are canceled by each other, and the transmit leakage signal received through the second leakage path is reduced and the signal is output, and e) the receive signal externally received through the antenna is amplified and the signal is output.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 3:
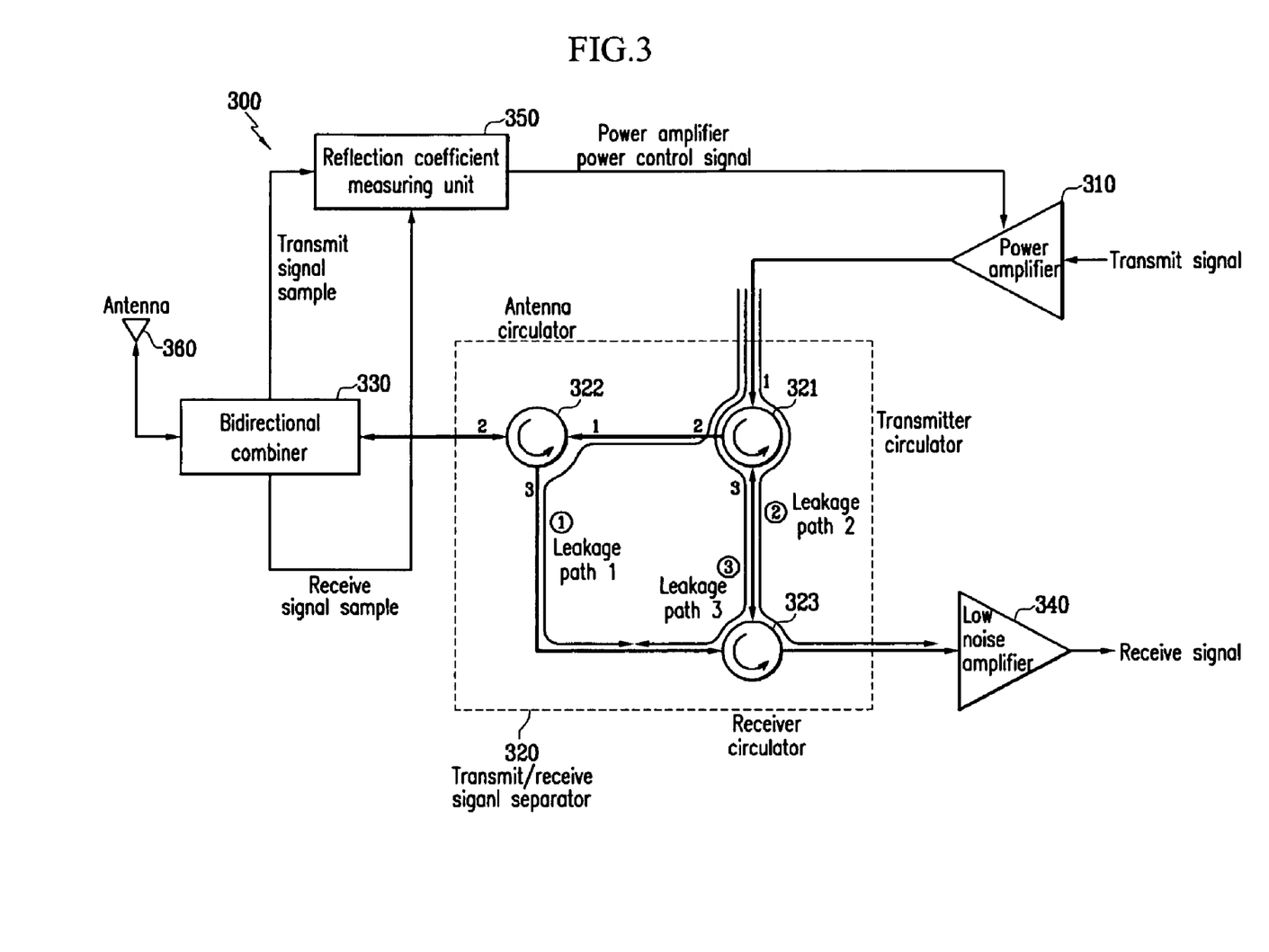
FIG. 3 shows a detailed diagram for representing an apparatus for separating transmit and receive signals in a radio system according to an exemplary embodiment of the present invention.

FIG. 3 shows a detailed diagram for representing an apparatus for separating transmit and receive signals in a radio system according to an exemplary embodiment of the present invention.

As shown in FIG. 3, the apparatus for separating transmit and receive signals in a radio system according to the exemplary embodiment of the present invention includes a power amplifier 310, a transmit/receive signal separator 320, a bidirectional combiner 330, a low noise amplifier 340, and a reflection coefficient measuring unit 350. The transmit/receive signal separator 320 includes a transmitter circulator 321, an antenna circulator 322, and a receiver circulator 323.

The power amplifier 310 amplifies a transmit signal to be radiated and output through an antenna 360.

The transmit/receive signal separator 320 separates transmit and receive signals by using three circulators 321, 322, and 323, which are three-port devices.

The bidirectional combiner 330 radiates the transmit signal through the antenna 360 or applies a receive signal received from the antenna 360 to the transmit/receive signal separator 320. At this time, the bidirectional combiner 330 respectively measures transmit and receive power in order to measure a reflection coefficient afterwards.

The low noise amplifier 340 amplifies the receive signal applied from the transmit/receive signal separator 320 and outputs the amplified signal.

The reflection coefficient measuring unit 350 measures a reflection coefficient by respectively comparing the transmit and receive powers measured by the bidirectional combiner 330, and stops the power amplifier 310 from operating by generating an alarm signal and transmitting a power control signal to the power amplifier 310 when the measured reflection coefficient exceeds a reference value.

That is, the reflection coefficient measuring unit 350 controls the operation of the power amplifier 310 because the reflection coefficient exceeds the reference value when the transmit power corresponds to the receive power.

Accordingly, a high output transmit signal of the power amplifier 310 is prevented from being reflected from the antenna and being leaked when the reflection coefficient of the antenna is increased by antenna separation. That is, no additional device is required to protect the receiver.

The respective circulators of the transmit/receive signal separator 320 and operation of separating signals by using the respective circulators will now be described.

The transmitter circulator 321 output a high output transmit signal which is output from the power amplifier 310 through a transmission path (port 1→port 2, a path that a signal transmit loss is minimized). At this time, the high output transmit signal has a low insertion loss.

The antenna circulator 322 outputs a high output transmit signal which is input through the port 1 through a transmission path (port 1→port 2), and radiates the signal through the antenna 360. At this time, the radiated high output transmit signal has a low insertion loss.

The transmitter circulator 321 outputs a transmit leakage signal leaked when the transmit signal is output through the transmission path through two other leakage paths ② and ③. At this time, the transmit leakage signal has a signal reduction of −20 dB compared to the transmit signal.

That is, the circulators 321, 322, and 323 according to the present invention reduce the transmit leakage signal by a predetermined amplitude of isolation (conventionally, −20 dB), output the transmit leakage signal through a leakage path, and therefore the receiver is protected.

The antenna circulator 322 outputs the transmit leakage signal leaked when the transmit signal is output through the transmission path through a first leakage path ①. At this time, the transmit leakage signal also has a signal reduction of −20 dB compared to the transmit signal output through the transmission path.

The receiver circulator 323 outputs the leakage signal of the transmitter circulator 321 through a second leakage path ② and a third leakage ③ path.

As shown in the above signal flow, the transmit leakage signal is leaked to the receiver (the low noise amplifier) through the first to the third leakage paths ① to ③.

The transmit leakage signal leaked to the receiver through the first leakage path ① and the transmit leakage signal leaked to the receiver through the third leakage path ③ are inverted with respect to each other, and therefore the signals are canceled by each other.

The transmit leakage signal leaked to the receiver through the second leakage path ② has a signal reduction (conventionally, −40 dB) by the transmitter circulator 321 and the receiver circulator 323, and therefore the signal leaked to the receiver is lessened, which increases the reliability of the radio system by the receiver protection.

Figure 4:
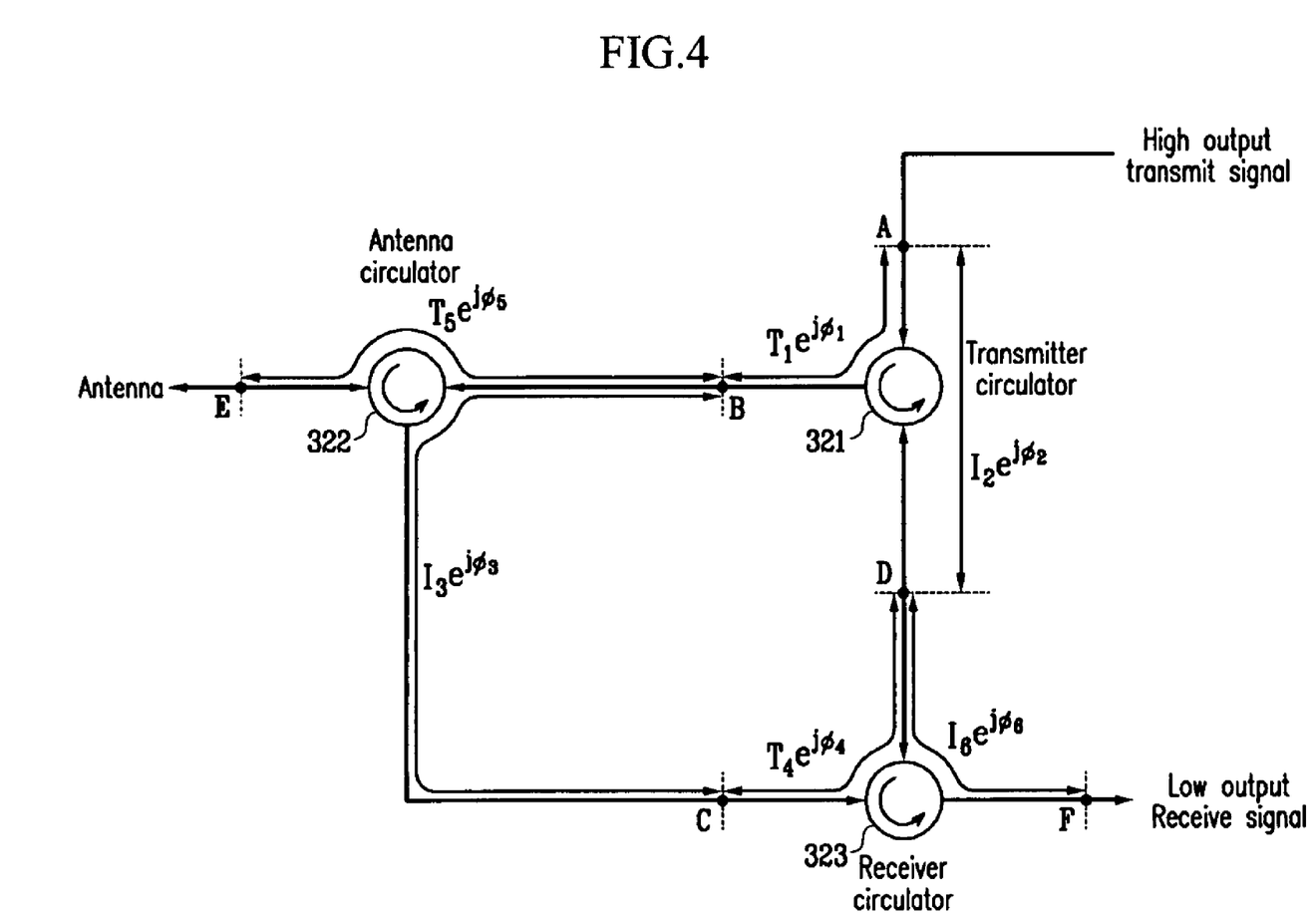
FIG. 4 shows a diagram for representing operations of the apparatus for separating transmit and receive signals shown in FIG. 3.

FIG. 4 shows a diagram for representing operation of the apparatus for separating transmit and receive signals shown in FIG. 3, which will now be described based on signals.

As shown in FIG. 4, the high output transmit signal (the power amplifier output signal) having a transfer function $T_1 e^{j\Phi 1}$ of a path AB is input to the antenna circulator 322 as the high output transmit signal passes through the transmission path of the transmitter circulator 321.

When a transfer function of a path BE is $T_5 e^{j\Phi 5}$, the high output transmit signal has a transfer function which is given as Equation 1, and the signal is transmitted to the antenna.

$$\text{Transmit signal transfer function} = T_1 \times T_5 \times e^{j(\phi 1 + \phi 5)} \quad \text{[Equation 1]}$$

At this time, a value of the transfer function is conventionally below 1 dB.

When a transfer function of a path AD is $I_2 e^{j\Phi 2}$ and a transfer function of a path DF is $I_6 e^{j\Phi 6}$, a transfer function of the second leakage path ⓡË is given as Equation 2.

Transfer function of the second leakage path=$I_2 \times I_6 \times e^{j(\phi_2+\phi_6)}$ [Equation 2]

At this time, a value of isolation (transmit leakage signal reduction rate) is about 20 dB, and therefore total isolation of 40 dB is given.

The signals of the first and the third leakage paths ⓇÁ and ⓇÈ flow in opposite directions to each other, and therefore the signals are combined. The transfer function between the paths ⓇÁ and ⓇÈ is given as [Equation 3]

Transfer function of the first leakage path $ABC$+ transfer function of the third leakage path $ADC = T_1 \times I_3 \times e^{j(\phi_1+\phi_3)} + I_2 \times T_4 \times e^{j(\phi_2+\phi_4)}$. [Equation 3]

At this time, values of T·, and I·, correspond to each other, and therefore the transmit leakage signal of the second leakage path ⓇË and the transmit leakage signal of the third leakage path ⓇÈ are canceled out and are not applied to the receiver when phases satisfy Equation 4.

$\phi_1+\phi_3=\phi_2+\phi_4+\pi$ [Equation 4]

Accordingly, the power leaked to the receiver by the high output transmit signal is input to the receiver while having double the isolation according to a single circulator.

Figure 5:
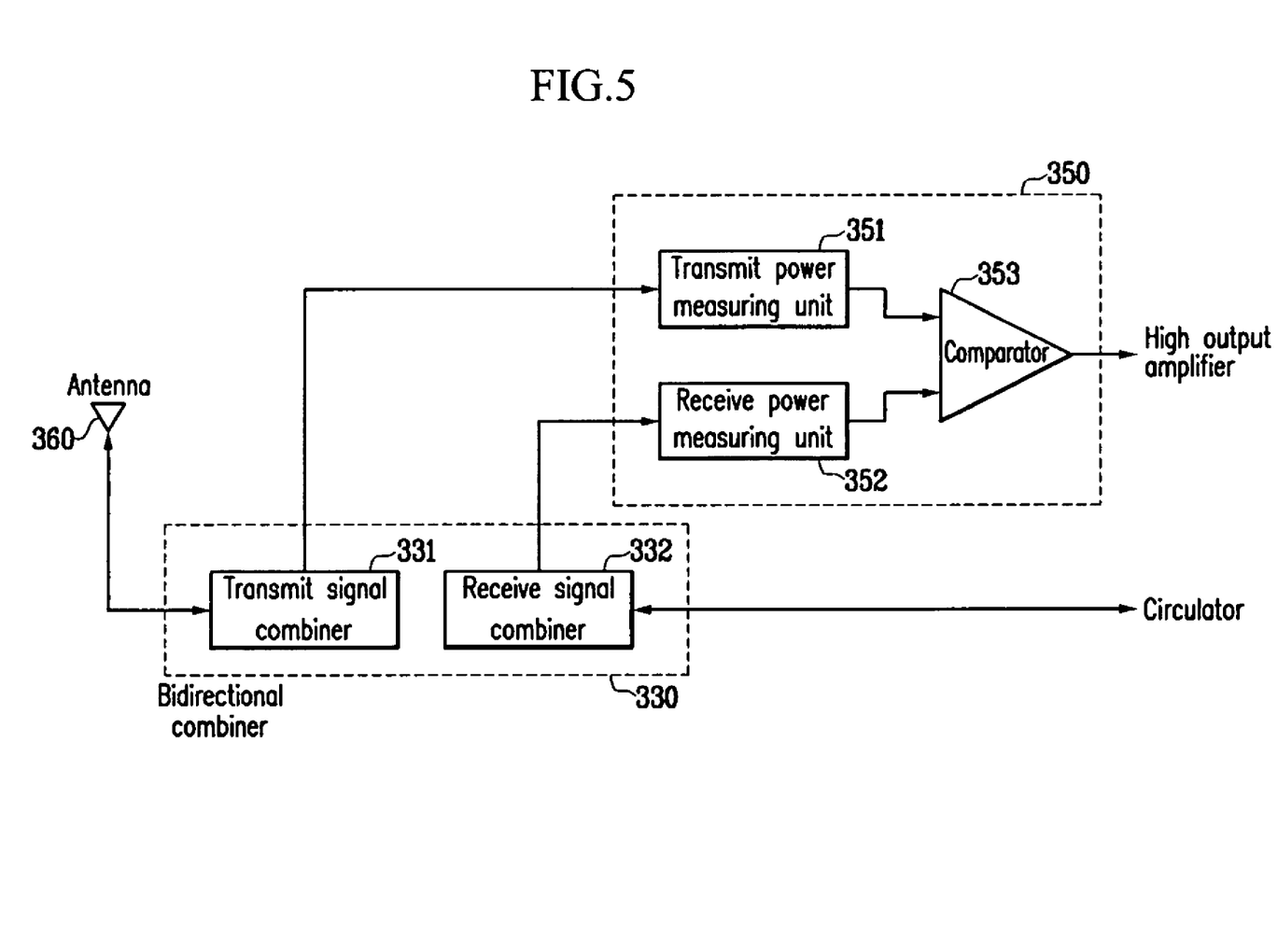
FIG. 5 shows a detailed diagram for representing a reflection coefficient measuring unit shown in FIG. 3.

FIG. 5 shows a detailed diagram for representing the reflection coefficient measuring unit shown in FIG. 3.

As shown in FIG. 5, the reflection coefficient measuring unit 350 includes a transmit power measuring unit 351, a receive power measuring unit 352, and a comparator 353, and the bidirectional combiner 330 includes a transmit signal combiner 331 and a receive signal combiner 332.

The transmit signal combiner 331 of the bidirectional combiner 330 performs a sampling operation on the transmit signals amplified by a predetermined amplitude by the power amplifier 310.

The receive signal combiner 332 performs a sampling operation on the receive signals received from the antenna 360.

The transmit power measuring unit 351 of the reflection coefficient measuring unit 350 measures power of the sampled transmit signal, and the receive power measuring unit 352 measures power of the sampled receive signal.

The comparator 353 compares the power of the measured transmit and receive signals and measures a reflection coefficient, and interrupts output of the power amplifier by generating an alarm signal when the measured coefficient exceeds a reference value.

That is, the comparator 353 interrupts the output of the transmit signal by outputting a power control signal to the power amplifier 310 because the reflection coefficient exceeds the reference value when the transmit power corresponds to the receive power.

Accordingly, it is prevented that a high output transmit signal of the power amplifier 310 is reflected from the antenna and is leaked when the reflection coefficient of the antenna is increased by antenna separation.

Operation of the apparatus for separating the transmit and receive signals in the radio system will now be described.

Figure 6:
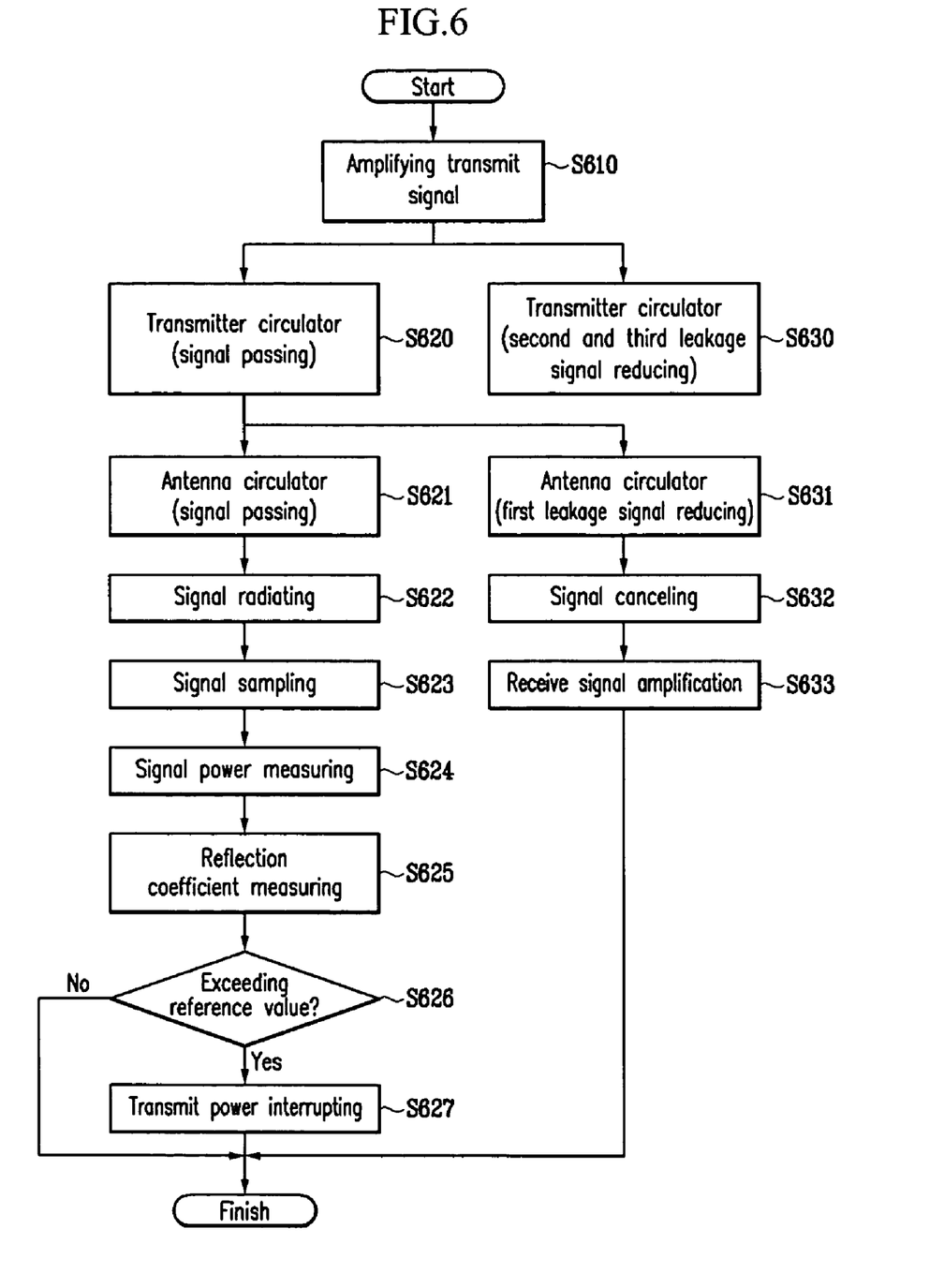
FIG. 6 shows a flow chart for sequentially representing the operation of the apparatus for separating transmit and receive signals shown in FIG. 3.

FIG. 6 shows a flow chart for sequentially representing the operation of the apparatus for separating transmit and receive signals shown in FIG. 3.

As shown in FIG. 6, the power amplifier 310 of the apparatus 300 for separating transmit and receive signals amplifies the transmit signal to be radiated through the antenna 360 and outputs the amplified signal S610.

The receiver circulator 321 outputs the output transmit signal through a transmission path (port 1→port 2) with a lessened signal transmit loss S620.

The antenna circulator 322 outputs the high output transmit signal received from the transmitter circulator 321 through the transmission path (port 1→port 2) S621, and allows the signal to be radiated through the antenna 360 S622.

The transmitter circulator 321 outputs a transmit leakage signal leaked when the transmit signal is output through a transmission path through two other leakage paths ② and ③ S630. At this time, the leakage transmit signal has a signal reduction of −20 dB compared to the transmit signal output through the transmission path.

That is, the circulators 321, 322, and 323 according to the present invention reduce the transmit leakage signal by a predetermined amplitude of isolation (conventionally, −20 dB), output the transmit leakage signal through the respective leakage paths ② and ③, and therefore the receiver is protected.

The antenna circulator 322 outputs the transmit leakage signal leaked when the transmit signal is output through the transmission path through a first leakage path ①. At this time, the transmit leakage signal also has a signal reduction of −20 dB compared to the transmit signal output through the transmission path.

As shown in the above signal flow, the transmit leakage signal is leaked to the receiver (the low noise amplifier) through the first to the third leakage paths ① to ③.

The transmit leakage signal leaked to the receiver through the first leakage path ① and the transmit leakage signal leaked to the receiver through the third leakage path ③ are inverted with respect to each other, and therefore the signals are canceled out by each other S632.

The transmit leakage signal leaked to the receiver through the second leakage path ② has a signal reduction (conventionally, −40 dB) by the transmitter circulator 321 and the receiver circulator 323, and therefore the signal leaked to the receiver is lessened, which increases the reliability of the radio system by the receiver protection.

The low noise amplifier 340 amplifies the receive signal received through the antenna 360 by a predetermined amplitude and outputs the signal S633.

The transmit signal combiner 331 of the bidirectional combiner 330 performs a sampling operation on the transmit signals amplified by predetermined amplitude by the power amplifier 310. The receive signal combiner 332 performs a sampling operation on the receive signals reflected from the antenna S623.

The transmit power measuring unit 351 of the reflection coefficient measuring unit 350 measures power of the sampled transmit signal, and the receive power measuring unit 352 measures power of the sampled receive signal S624.

The comparator 353 compares the power of the measured transmit and receive signals and measures a reflection coefficient S625, and interrupts output of the power amplifier by generating an alarm signal S627 when the measured coefficient exceeds a reference value S626.

That is, the comparator 353 interrupts the output of the transmit signal by outputting a power control signal to the power amplifier 310 because the reflection coefficient exceeds the reference value (over 1) when the transmit power corresponds to the receive power.

Accordingly, a high output transmit signal of the power amplifier 310 is prevented from being reflected from the antenna and being leaked when the reflection coefficient of the antenna is increased by antenna separation.

As shown, the transmit signal leaked to the receiver is reduced by a predetermined amplitude by using circulators having a high isolation in the apparatus and the method for separating the transmit and receive signals for the time division duplexing radio system according to the exemplary embodiment, and therefore the receiver is protected from the high output transmit signal without using additional semiconductors.

The present invention provides a stable radio system for protecting the receiver by preventing the transmit signal radiated through the antenna from being reflected from the antenna and being leaked to the receiver.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for separating transmit and receive signals in a radio system for transmitting and receiving a signal by using a single frequency and an antenna, comprising:
   a power amplifier for amplifying a transmit signal and outputting the signal;
   a transmitter circulator for passing the amplified transmit signal through a transmission path with a lessened signal loss, and respectively outputting a transmit leakage signal to first, second, and third leakage paths for reducing the transmit leakage signal;
   an antenna circulator for passing the transmit signal through the transmission path and radiating the signal through an antenna, and outputting the leaked transmit leakage signal to the first leakage path to be reduced; and
   a receiver circulator for inverting the transmit leakage signals received through the first and third leakage paths with respect to each other and canceling out the signals, and reducing the transmit leakage signal received through the second leakage path and outputting the signal.

2. The apparatus of claim 1, further comprising:
   a bidirectional combiner for sampling part of the transmit signals received through the transmission path of the antenna circulator and the receive signals externally received through the antenna; and
   a reflection coefficient measuring unit for measuring a reflection coefficient of the antenna by measuring power of the sampled transmit and receive signals, and interrupting a transmit signal output of the power amplifier when the measured reflection coefficient exceeds a reference value.

3. The apparatus of claim 2, wherein the reflection coefficient measuring unit comprises:
   a transmit power measuring unit for measuring power of the sampled transmit signal;
   a receive power measuring unit for measuring power of the sampled receive signal; and
   a comparator for generating an alarm signal and transmitting a control signal for interrupting the output of the transmit signal to the power amplifier.

4. The apparatus of claim 2, further comprising a low noise amplifier for amplifying the receive signal externally received through the antenna and outputting the amplified signal.

5. The apparatus of claim 1, wherein the transmit leakage signal output from the receiver circulator is less than the transmit signal by at least 40 dB.

6. A method for separating transmit and receive signals in a radio system for transmitting and receiving signals by using a single frequency and an antenna, comprising:
   a) amplifying the transmit signal and outputting the amplified signal;
   b) respectively outputting a transmit leakage signal through first, second, and third leakage paths for reducing the transmit leakage signal leaked when the amplified transmit signal is passed through a transmission path;
   c) reducing the transmit leakage signal leaked when the transmit signal is radiated through the antenna by outputting the transmit leakage signal through the first leakage path;
   d) canceling the transmit leakage signals received through the first and third leakage paths with each other, and reducing the transmit leakage signal received through the second leakage path and outputting the reduced transmit leakage signal; and
   e) amplifying the receive signal externally received through the antenna and outputting the amplified signal.

7. The method of claim 6, further comprising:
   f) sampling part of the transmit signals radiated through the antenna and the receive signals externally received through the antenna; and
   g) measuring a reflection coefficient of the antenna by measuring power of the sampled transmit and receive signals, and interrupting an output of the transmit signal when the measured reflection coefficient exceeds a reference value.

8. The method of claim 7, further comprising, in g),
   measuring power of the sampled transmit signal;
   measuring power of the sampled receive signal; and
   generating an alarm signal and interrupting the output of the transmit signal when the measured transmit and receive signals correspond to each other.

* * * * *